United States Patent [19]

Long et al.

[11] Patent Number: 4,741,924

[45] Date of Patent: May 3, 1988

[54] METHOD OF MAKING A POLYMERIC COATED FABRIC LAYER

[75] Inventors: Delmar D. Long, Rock Hill, S.C.; John F. Anderson, Jr., Springfield, Mo.

[73] Assignee: Dayco Products, Inc., Dayton, Ohio

[21] Appl. No.: 874,955

[22] Filed: Jun. 16, 1986

Related U.S. Application Data

[63] Continuation-in-part of Ser. No. 676,465, Nov. 29, 1984, abandoned, which is a continuation of Ser. No. 488,831, Apr. 26, 1983, abandoned.

[51] Int. Cl.$^4$ .......................... B05D 3/02; B05D 3/12
[52] U.S. Cl. .................................... 427/173; 427/176; 427/211; 427/381; 427/389.9
[58] Field of Search ............... 427/176, 173, 381, 211, 427/389.9

[56] References Cited

U.S. PATENT DOCUMENTS

| | | | |
|---|---|---|---|
| 3,296,062 | 1/1967 | Truslow | 428/257 X |
| 3,784,427 | 1/1974 | Griffin | 156/139 |
| 4,062,989 | 12/1977 | Long | 427/176 |
| 4,238,530 | 12/1980 | Hollaway et al. | 427/173 |

*Primary Examiner*—Evan K. Lawrence
*Attorney, Agent, or Firm*—Joseph V. Tassone

[57] ABSTRACT

A polymeric coated fabric layer and method of making the same are provided, the polymeric coated fabric layer comprising a fabric layer having warps and fills initially woven at a certain angle relative to each other and then changed to another angle whereby the fabric layer is in an altered condition thereof, and polymeric material secured to the fabric layer and holding the fabric layer in the altered condition thereof, the fabric layer having a twill weave or a satin weave. The resultant product holds a greater proportion of polymeric material than a quality equivalent plain woven fabric layer having substantially the same yarn and weight per square yard.

6 Claims, 2 Drawing Sheets

SATIN WEAVE

TWILL WEAVE

PLAIN WEAVE

METHOD OF MAKING A POLYMERIC COATED FABRIC LAYER

CROSS-REFERENCE TO RELATED APPLICATIONS

This application is a continuation-in-part of application Ser. No. 676,465, filed Nov. 29, 1984, now abandoned, which, in turn, is a continuation of application Ser. No. 488,831, filed Apr. 26, 1983, now abandoned.

BACKGROUND OF THE INVENTION

1. Field of the Invention

This invention relates to a new method of making a polymeric coated fabric layer.

2. Prior Art Statement

It is known to provide a polymeric coated fabric layer means comprising a fabric layer having warps and fills initially woven at a certain angle relative to each other and then changed to another angle whereby the fabric layer is in an altered condition thereof, and polymeric means secured to the fabric layer and holding the fabric layer in the altered condition thereof. For example, see the U.S. Pat. Nos. 3,784,427; to Griffin, 4,062,989 to Long, and 4,238,530 to Hollaway et al.

It is also known to provide a fabric layer that has a twill weave or a satin weave together with an elastomeric wear surface thereon for use in power transmission belts and the like. For example, see the U. S. Pat. No. 3,296,062 to Truslow.

However, applicants are unaware of any teaching or suggestion wherein a fabric layer having a twill weave or a satin weave has the initial woven angle of the warps and fills thereof altered to another angle to be held in that altered condition by a polymeric means as required by applicants' invention.

SUMMARY OF THE INVENTION

It is one feature of this invention to provide a new method of making a polymeric coated fabric layer or fabric layer means, adapted to be secured to a surface of an endless power transmission belt construction and the like, for example.

In particular, it is well known that the use of a wide angle bias fabric, as needed for flexibility, conformability and cross-sectional rigidity, has long been recognized as intrinsic to end product quality in certain composite structures, such as V-belts, flexible ducting, diaphragms, etc. For example, the warp/fill angle in a plain woven fabric structure can be altered from the normal 90° thereof to approximately 120°. Such altered fabric material is combined with polymeric material to hold the fabric in this altered condition for the previously stated uses and the like. For example, see the aforementioned U.S. Pat. Nos. 3,784,427; 4,062,989 and 4,238,530 whereby these three U.S. Patents are being incorporated into this disclosure by this reference thereto.

However, it was found according to the teachings of this invention that if the number of crossover points in a woven fabric structure is reduced from the number of crossover points in a plain woven fabric structure, not only can a greater amount of polymeric material be held by such fabric material in its altered condition, but also ultra high angles between the warps and fills of such fabric material can be affected, such as approximately 150° and the like.

It was further found according to the teachings of this invention that such a woven fabric material can have a twill weave or a satin weave to provide the above unique features.

For example, one embodiment of this invention provides a method of making a polymeric coated fabric layer means and comprising the steps of providing a fabric layer having warps and fills initially woven at a certain angle relative to each other, disposing the fabric layer on a tenter means, then changing the certain angle with the tenter means to another angle whereby the fabric layer is in an altered condition thereof, and securing a polymeric means to the fabric layer to hold the fabric layer in the altered condition thereof, the step of securing the polymeric means comprising the steps of first coating the polymeric means in liquid form onto the fabric layer while the fabric layer is in the altered condition thereof and is on the tenter means and then drying the coating to at least a condition thereof that tends to hold the fabric layer in the altered condition thereof. The step of providing the fabric layer comprises the step of forming the fabric layer to have a weave selected from the group of weaves consisting of twill weaves and satin weaves, the step of changing the certain angle to another angle comprises the step of changing the certain angle of the fabric layer that has the twill weave or the satin weave to an angle that is greater than the angle that can be made by changing the certain angle of a substantially quality equivalent fabric layer that has a plain weave. The step of coating in combination with the step of changing the certain angle to another angle causes the ratio of the weight of the fabric material to the weight of the polymeric material of the polymeric coated fabric layer means to be approximately 50 or less: 50 or greater whereas assuming quality equivalents and without a total weight change the ratio of the weight of the fabric material to the weight of the polymeric material is approximately 60:40 when the quality equivalent fabric layer that has a plain weave has the polymeric material coated thereon in the same manner.

Accordingly it is an object of this invention is to provide a new method of making a polymeric coated fabric layer or fabric layer means, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 2:
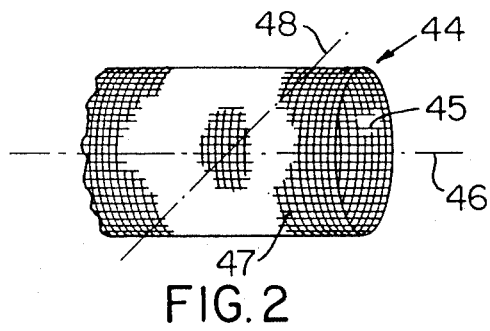
FIG. 2 is a schematic perspective view of a woven fabric in the tubular form and illustrates how the same is cut on a bias to provide the continuous bias fabric layer or strip of FIG. 3.

While the various features of this invention are hereinafter illustrated and described as being particularly adapted to provide a polymeric coated fabric layer means for making particular products, it is to be understood that the various features of this invention can be utilized singly or in various combinations thereof to provide a polymeric coated fabric layer means for other uses and/or other products as desired.

Therefore, the product made according to this invention is not to be limited to only the embodiments illustrated in the drawings, because the drawings are merely utilized to illustrate one of the wide variety of uses of this invention.

Figure 1:
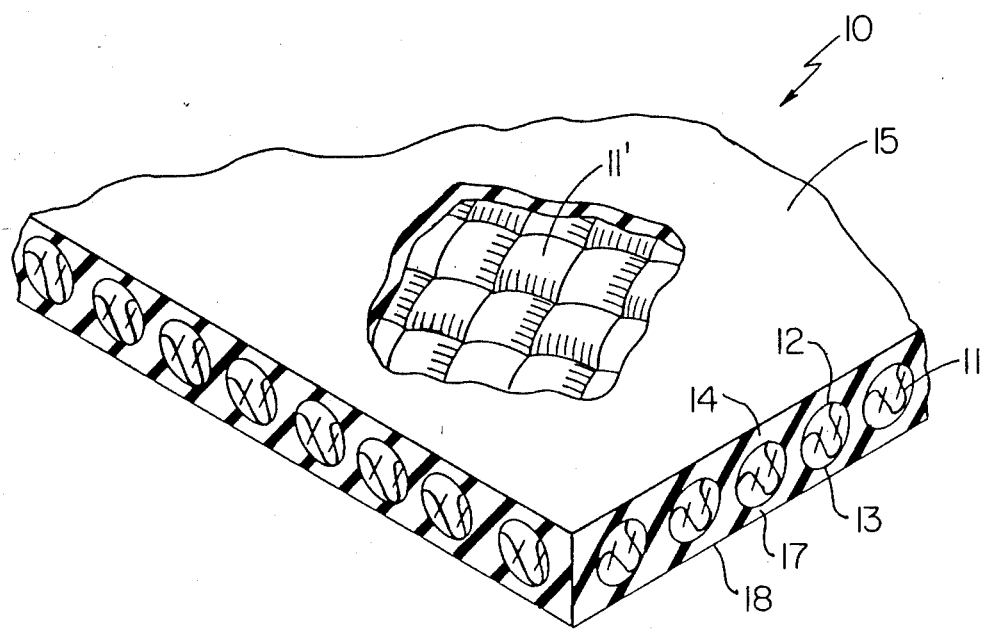
FIG. 1 is an enlarged, broken away, cross-sectional schematic and perspective view of the improved polymeric coated fabric layer means made according to this invention.

Referring now to FIG. 1, the new polymeric coated fabric layer means made according to this invention is generally indicated by the reference numeral 10 and comprises a suitable fabric layer 11 having a twill weave or a satin weave for the purpose hereinafter set forth and having opposed sides 12 and 13.

A layer 14 of polymeric material is secured to the side 12 of the fabric layer 11 in a manner hereinafter set forth and has an outer substantially flat surface 15, the polymeric layer 14 comprising any suitable polymeric material, such as a latex.

Another layer 17 of any suitable polymeric material, such as a latex, is secured to the other side 13 of the fabric layer so as to define a substantially flat outer surface 18 thereof which is adapted to be subsequently secured to a surface of a desired polymeric product, such as a belt body or the like.

If desired, the surface 18 of the layer 17 can be provided with an additional tacky polymeric layer for this securement purpose as fully set forth in the U.S. Pat. No. 4,501,771 to Long. Since this patent describes the various uses of polymeric coated fabric layer means and a method and apparatus for making the same which is similar to this invention as will be apparent hereinafter, this patent is being incorporated into this disclosure by this reference thereto.

One such use of the polymeric coated fabric layer means 10 is to provide a reinforcing surface for a belt construction. For example, reference is now made to FIG. 7, wherein a polymeric product is generally indicated by the reference numeral 20 and comprises an endless power transmission belt of a typical "V" type wherein the polymeric body 21 thereof has a substantially trapezoidal cross-sectional configuration defined by a pair of opposed flat parallel top and bottom surfaces 22 and 23 with a pair of angled side surfaces 24 and 25 disposed therebetween, the belt construction 20 having the conventional tension section 26, compression section 27 and load carrying section 28 disposed intermediate the tension section 26 and compression section 27 with the sections 26, 27 and 28 being made mainly of polymeric material in a manner well known in the art.

As is conventional in the art, the opposed angular surfaces 24 and 25 of the belt construction 20 are each adapted to have a friction layer, that comprises a fabric impregnated with a polymeric composition, secured thereon by such friction layer either being disposed only on the surfaces 24 and 25 thereof or by having the entire outside surface of the belt body 21 wrapped with friction layer, the friction layer being secured to the belt body 21 during a subsequent heat curing or vulcanizing operation.

Figure 7:
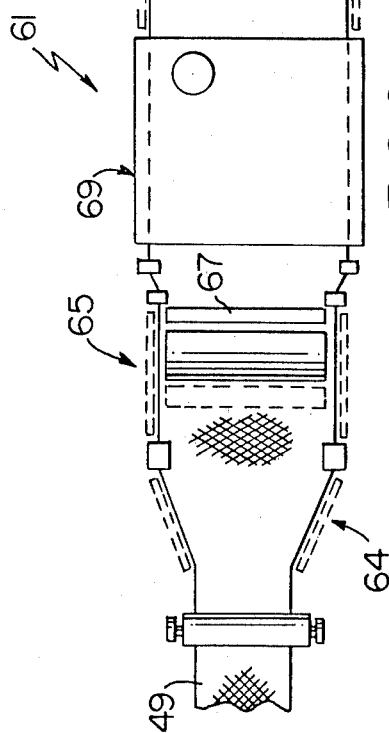
FIG. 7 is a cross-sectional view of an endless power transmission belt construction and the like utilizing the polymeric coated fabric layer means of this invention that is illustrated in FIG. 1.

In any event, it can be seen that the belt construction 20 illustrated in FIG. 7 is completely wrapped by a strip of the polymeric coated fabric layer means 10 so that the opposed ends 29 and 30 of the layer means 10 are disposed and secured in overlapping relation, such as on the top surface 22 of the belt construction 20 as illustrated in FIG. 7 and is conventional in the belt making art.

When utilizing the layer means 10 for forming the belt construction 20 of FIG. 7, it can be seen that the side or surface 18 of the layer means 10 is disposed in contact with the outer surfaces 22, 23, 24 and 25 of the polymeric body 21 of the belt construction 20 so as to readily conform to and be secured to such surfaces 22, 23, 24 and 25 during a subsequent heat curing or vulcanizing of the belt construction 20 after the polymeric coated fabric layer means 10 of this invention has been wrapped on the belt body 21 in a manner well known in the art of making belt constructions.

As illustrated in FIG. 7, the outer surface 15 of the polymeric layer 14 provides the contact facing of the belt construction 20 at the driving or driven sides 24 and 25 thereof as is conventional in the art.

Figure 8:
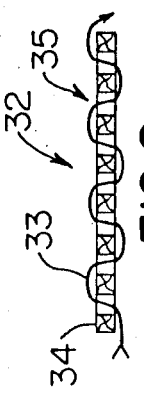
FIG. 8 is a fragmentary schematic cross-sectional view illustrating a fabric structure having a plain weave.

It is believed according to the teachings of this invention that the polymeric coated fabric layer means 10 is greatly improved over conventional polymeric coated fabric layer means because the polymeric coated fabric layer means 10 has the fabric layer 11 comprising a woven structure other than a plain woven structure wherein the same has, as illustrated in FIG. 8, the fills 33 thereof interlaced with the warps 34 thereof in such a manner that each fill 33 goes over and then under the warps 34 so as to provide a crossover point 35 with each warp 34.

However, it was found according to the teachings of this invention that because in a twill weave and in a satin weave, the number of crossover points for the fills and warps thereof is reduced over the mumber of crossover points 35 in the plain woven structure 32 and that this feature actually permits more polymeric material to be secured to the fabric structure as well as permits the warp/fill angle of the fabric structure to be altered to greater angles than a plain woven fabric as will be apparent hereinafter.

Figure 9:
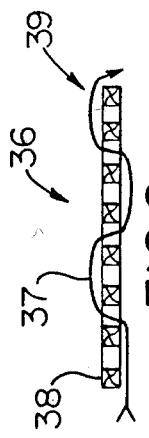
FIG. 9 is a view similar to view 8 and illustrates a fabric structure having a twill weave.

For example, reference is now made to FIG. 9 wherein one type of fabric with a twill weave is generally indicated by the reference numeral 36 and has the fills 37 thereof interlaced with the warps 38 thereof in such a manner that each fill 37 skips every other warp 38 before being laced under the next set of warps 38 so that the number of crossover points 39 in the woven structure of FIG. 9 is substantially less than the number of crossover points 35 provided by the plain woven fabric 32 of FIG. 8 for substantially the same amount of fabric material.

Figure 10:
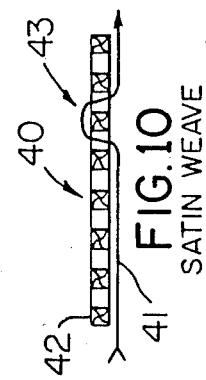
FIG. 10 is a view similar to FIG. 8 and illustrates a fabric structure having a satin weave.

Similarly, a fabric layer having a satin weave is generally indicated by the reference numeral 40 in FIG. 10 and has the fills 41 thereof interlaced with the warps 42 thereof in such a manner that each fill 41 is only laced over one of the warps 42 in the series thereof illustrated in FIG. 10 so that the number of crossover points 43 in a satin weave is greatly reduced over the number of crossover points 35 in the plain woven structure 32 of FIG. 8 for substantially the same amount of fabric material.

Therefore, it can be seen that it is a feature of this invention to provide a method of making a fabric material that has a weave selected from the group of weaves consisting of twill weaves and satin weaves and that will form the polymeric coated layer means 10 of this invention when made by any of the methods and apparatus that can be utilized to alter the woven structure thereof and have that altered woven structure held in such condition by a polymeric means secured thereto to produce the polymeric coated fabric means.

For example, reference is now made to FIG. 2 wherein a fabric structure 44 has been woven with a twill weave or a satin weave in tubular form with the warps 45 thereof disposed substantially parallel to the longitudinal axis 46 of the tubular structure and with the fills 47 thereof disposed substantially 90° relative to the warps 45.

Figure 3:
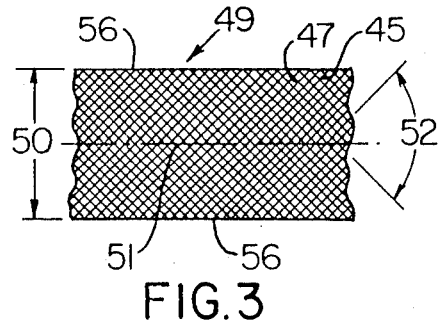
FIG. 3 is a fragmentary top view of the bias cut fabric layer or strip produced from the woven fabric tube of FIG. 2.

As is conventional in the art, the tubular structure of FIG. 2 is cut on a bias, such as at 45° as represented by the dash-dotted line 48 in FIG. 2, to produce a continuous strip 49 of fabric material as illustrated in FIG. 3 of a width 50, the warps 45 and fills 47 thereof each being disposed at an angle of approximately 45° relative to the longitudinal axis 51 of the strip 49 even though the warps 45 and fills 47 are still disposed at the woven angle of 90° relative to each other as represented by the reference numeral 52 in FIG. 3.

In order to add flexibility to the fabric strip 49 of FIG. 3 for the reasons previously set forth, it is conventional in the art to alter the angle 52 between the warps 45 and fills 47 thereof so that the same make a larger angle than the original woven angle of 90° thereof. For example, such altered angle between the warps 45 and fills 47 of the fabric strip 49 can be between approximately 100° to approximately 150° so as to render the resulting polymeric coated fabric strip relatively flexible for its intended purpose as previously set forth.

Figure 4:
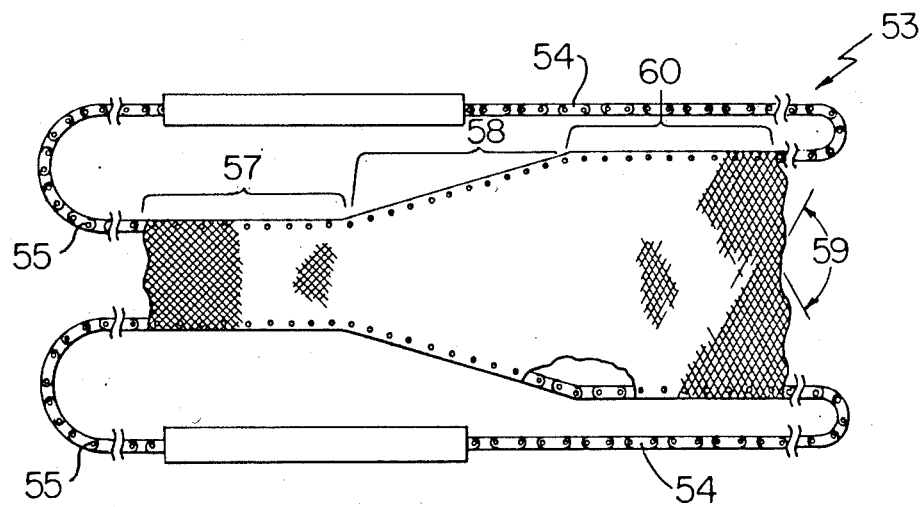
FIG. 4 is a fragmentary partially broken away top schematic view of a conventional pin tenter frame for stretching the woven fabric layer or strip of FIG. 3 to alter the angle between the warps and fills thereof.

For example, one means for altering the angle between the warps 45 and fills 47 of the strip 49 comprises a conventional pin tenter frame as illustrated in FIG. 4 and generally indicated by the reference numeral 53.

As is well known, the pin tenter frame 53 includes a pair of spaced apart driven endless chains 54 each of which carries a series of pins 55 adapted to be attached to one edge 56 of the strip of fabric 49. The spaced apart chains 54 are disposed to provide substantially three zones in the apparatus 53, the first of these being the feeding and mounting zone 57 wherein the strip 49 is fed to and mounted onto the pins 55 where the chains 55 are parallel and spaced apart at a distance somewhat less than the width 50 of the strip 49. The second zone of the apparatus 53 is generally indicated by the reference numeral 58 and comprises the stretching zone wherein the strip 49 is tensioned i.e., stretched in the widthwise direction as the chains 54 diverge at a predetermined angle relative to the direction of fabric movement in the apparatus 53, which is from left to right in FIG. 4, to impart a predetermined stretch to the strip 49 and thereby cause the original angle 52 between the warps 45 and fills 47 of the strip of fabric material 49 to be altered to a larger angle thereof that is represented by the reference numeral 59 in FIG. 4 wherein the stretched fabric strip 49 now enters the altered condition zone 60 of the apparatus 53.

It is desired to hold the fabric 49 in its altered condition while the fabric is in the zone 60 of the apparatus 53 by securing the polymeric material to the altered fabric 49 whereby the polymeric material will hold the warps 45 and fills 47 in this altered condition.

One such method and apparatus for applying the polymeric material to the altered fabric strip 49 is generally indicated by the reference numeral 61 in FIGS. 5 and 6 and will now be described, the method and apparatus 61 being substantially the same as the method and apparatus set forth in the aforementioned U.S. Pat. No. 4,501,771.

Figure 6:
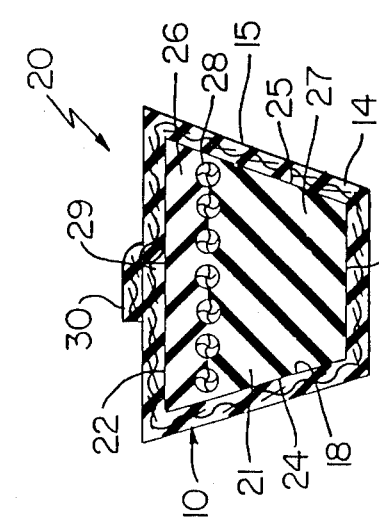
FIG. 6 is a schematic broken away top view of the method and apparatus illustrated in FIG. 5.
Figure 5:
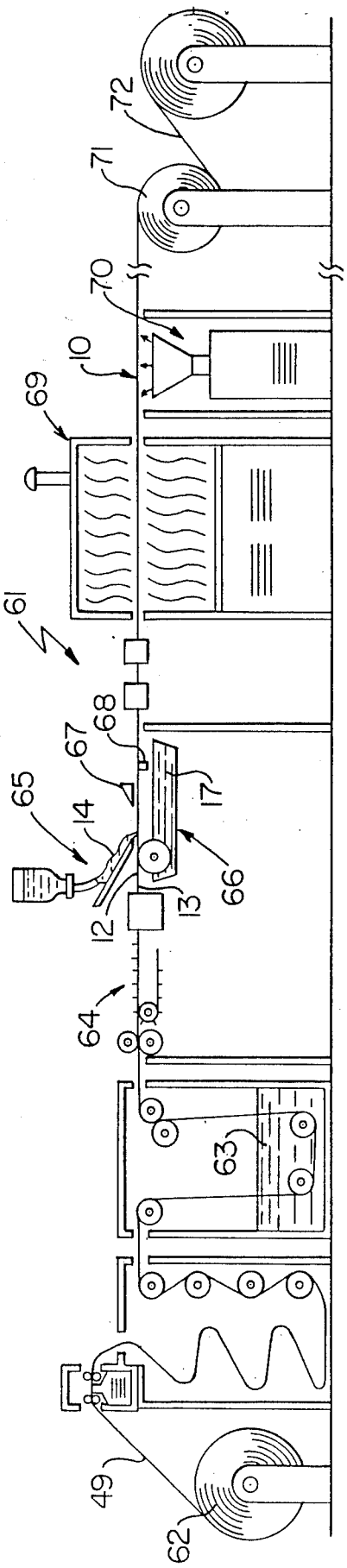
FIG. 5 is a schematic side view of a method and apparatus utilized to produce the polymeric coated fabric layer means of this invention that is illustrated in FIG. 1.

As illustrated in FIG. 5, the fabric strip 49 in the unaltered condition thereof is fed from a supply roll 62 thereof through a liquid 63 that impregnates and lubricates the threads thereof so that the same can be readily stretched on a pin tenter frame that is generally indicated by the reference numeral 64 in FIGS. 5 and 6 and is of a type similar to the tenter frame 53 previously set forth, the tenter frame 64 stretching the fabric layer 49 in a direction transverse to the longitudinal direction of movement of the fabric strip 49 through the apparatus 61. Thereafter, the polymeric material 14 in liquid form is applied to the top surface 12 of the altered fabric sheet 49 while simultaneously the polymeric material 17 in liquid form is being applied to the bottom surface 13 of the altered fabric sheet 49 by respective coating means that are generally indicated by the reference numerals 65 and 66 in FIG. 5, such liquid materials 14 and 17 being respectively doctored by suitable doctor means 67 and 68 disposed on opposite sides of the now coated fabric sheet 11. The coatings 14 and 17 are sufficiently liquid to impregnate the fiber bundles 11' of the fabric layer 11 so as to provide good adhesion of the layers 14 and 17 to the fabric layer 11.

The coated sheet 11 is now passed through a heating means that is generally indicated by the reference numeral 69 in FIGS. 5 and 6 for substantially drying the coatings 14 and 17 without curing thereof but at least to a consistency thereof which causes the polymeric coatings 14 and 17 to maintain the fabric layer 11 in the altered condition thereof as provided by the tenter frame 64.

Of course, it is to be understood that additional coatings can be applied to the coatings 14 and 17 if it is desired to provide additional coatings thereon. Also, it is to be understood that only one coating 14 or 17 could be utilized, if desired.

In any event, the polymeric coated fabric layer means 10 emerging from the heating means 69 can be cooled by a cooling means 70 before the same is wound into a supply roll 71 thereof together with a sheet 72 wound therewith to prevent the wound polymeric coated fabric layer means 10 of this invention from securing to itself in the supply roll 71 thereof as is well known in the art.

Therefore, it can be seen that when it is desired to utilize the polymeric coated fabric layer means 10 made according to this invention, a sufficient quantity thereof can be dispensed from the supply roll 71 thereof to be utilized either by itself when subsequently heat cured or remaining uncured or in combination with a polymeric product, such as by forming the belt construction 20 in the manner previously described, whereby it can be seen that this invention provides an improved polymeric coated fabric layer means 10.

In particular, as previously stated, by having the fabric layer 11 being formed with a weave selected from the group of weaves consisting of twill weaves and satin weaves, the number of crossover points of the fills 47 with the warps 45 thereof is reduced over the number of such crossover points if the fabric 44 was a plain woven fabric thereof as illustrated in FIG. 8 whereby it has been found according to the teachings of this invention that not only will the twill weave or satin weave hold a greater amount of polymeric material when applied thereto in the liquid form previously set forth, but also the twill weave or satin weave readily permits the tenter frame 64 of the apparatus 61 to alter the initial woven condition thereof to an angle 59 which can approach approximately 150°, as desired, in order to render the resulting polymeric coated fabric means 10 sufficiently flexible for the intended end use thereof, such as being utilized in combination with the polymeric belt body 21 in FIG. 7 to form the belt construction 20 in the manner previously set forth.

In particular, assuming quality equivalents of the woven structures wherein the yarn for each woven structure is made of the same material, in the same manner and in the same size and weight and woven so that the woven structures have substantially the same weight per square yard thereof whereby substantially the only difference is in the weave of the equivalent woven structures, the use of such a twill woven structure or such a satin woven structure over such a plain woven structure can result in substantial cost savings by modifying the fabric to polymeric material ratio, i.e., the ratio of the weight of the fabric material to the weight of the polymeric material applied thereto, from approximately 60:40 for the plain woven equivalent structure to approximately 50:50 for the twill woven equivalent structure or the satin woven equivalent structure without a total weight change of the final product because it is believed that a twill weave is capable of holding more liquid polymeric material in the apparatus 61 of this invention than a plain weave and that a satin weave will hold still more liquid polymeric material than a twill weave.

Thus, by merely applying the polymeric material in substantially the same manner in the apparatus 61, the equivalent plain woven structure run therethrough will have a fabric to polymeric material weight ratio of approximately 60% by weight fabric material to approximately 40% by weight polymeric material whereas the equivalent twill woven structure or the equivalent satin woven structure run through the apparatus 61 will have a fabric to polymeric material weight ratio of approximately 50% by weight or less fabric material to approximately 50% by weight or greater polymeric material with the total weight of the coated plain woven structure being substantially the same as the total weight of the coated twill woven structure or the total weight of the coated satin woven structure.

As to the increased angularity between the warps 45 and fills 47 of a woven structure having a twill weave or a satin weave, it was found according to the teachings of this invention that the relationship between the warp/fill angle, increased flexibility of the end product and subsequent belt life so as to indicate that the wider the angle, the more flexible the belt construction (all things being considered equal), the lower the heat build up, and, thus, the greater the belt life. Belt tests have shown that 110° warp/fill angle fabrics used in a belt construction were outperformed by 120° warp/fill angle fabrics and that they in turn were outperformed by 135° warp/fill angle fabrics. Thus, it was found according to the teachings of this invention that when trying to solve the problem of determining a method of producing ultra high warp/fill angular fabrics that the solution revolves around the reduction or elimination of the locking angle of any woven fabric. For example, as the warp and fill of a given fabric is uniformly altered (biased), it approaches an angle wherein it is physically impaired for any further movement. Experimentation has shown that there are at least five factors that bear on the reduction and/or elimination of the locking angle, namely, yarn size, twist (crimp), count, balance and weave. Thus, it was found according to the teachings of this invention that a practical solution to such problem is to reduce the number of crossover points of a known structure by changing only the weave thereof and that a fabric structure with a twill weave or satin weave can be altered to the desired ultra high angles for the previously disclosed purposes.

Therefore, it can be seen that this invention provides a method of making a polymeric coated fabric layer means 10 comprising a fabric layer 11 having warps 45 and fills 47 initially woven at a certain angle 52 relative to each other and then changed to another angle 59 whereby the fabric layer 11 is in an altered condition thereof, and polymeric means 14, 17 secured to the fabric layer 11 and holding the fabric layer 11 in the altered condition thereof, the fabric layer 49 having a twill weave or a satin weave.

While the polymeric coated fabric layer means 10 has been illustrated and described as having two layers 14 and 17 of polymeric material secured thereto, it is to be understood that only one layer of polymeric material 14 or 17 can be utilized or a plurality of layers thereof as desired.

In addition, while the material forming the fabric layer 11 and the polymeric means 14, 17 can comprise any suitable materials or combinations thereof, it is to be understood that the same can be of the particular type or types set forth in the aforementioned U.S. patents that have been incorporated into this application by the previous reference thereto. Also, while the heating means 69 has been described as drying the coatings 14 and 17 to a condition that will hold the warps 45 and fills 47 of the fabric layer in its altered condition, such heating means 69 can provide such dried condition without curing the polymeric material 14 and 17 as in the aforementioned U.S. patents so that such coatings 14, 17 can be subsequently heat cured, such as during the formation of the final desired product as previously described, it is to be understood that the heating means 69 can cure the coatings 14 and 17 if desired as the final product may be such cured layer means 10.

Accordingly, it can be seen that this invention provides a new method of making a new polymeric product.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a method of making a polymeric coated fabric layer that has a certain total weight of fabric and polymeric material, said method comprising the steps of providing a fabric layer having warps and fills initially woven at a certain angle relative to each other, disposing said fabric layer on a tenter means, then changing said certain angle with said tenter means to another angle whereby said fabric layer is in an altered condition thereof, and securing a polymeric means to said fabric layer to hold said fabric layer in said altered condition thereof, the step of securing said polymeric means comprising the steps of first coating said polymeric means in liquid form onto said fabric layer while said fabric layer is in said altered condition thereof and is on said tenter means and then drying said coating to at least a condition thereof that tends to hold said fabric layer in said altered condition thereof, the improvement wherein the step of providing said fabric layer comprises the step of forming said fabric layer to have a weave selected from the group of weaves consisting of twill weaves and satin weaves and to have the yarn thereof of substantially the same size and weight and material as a certain plain woven fabric layer that has substantially the same weight per square yard thereof as the selected fabric layer is substantially quality equivalent to said certain plain woven layer, wherein the step of changing said certain angle to another angle comprises the step of changing said certain angle of said fabric layer that has said twill weave or said satin weave to an angle that is greater than the angle that can be made by changing said certain angle of said substantially quality equivalent fabric layer that has a plain weave, and wherein the step of coating in combination with the step of changing said certain angle to another angle causes said polymeric coated fabric layer to have said certain total weight with the ratio of the weight of the fabric material to the weight of the polymeric material of said polymeric coated fabric layer means to be approximately 50 or less: 50 or greater whereas assuming quality equivalents and without a total weight change the ratio of the weight of the fabric material to the weight of the polymeric material is approximately 60:40 when said quality equivalent fabric layer that has a plain weave has said polymeric material coated thereon in substantially the same manner.

2. A method of making a polymeric coated fabric layer as set forth in claim 1 wherein the step of changing said certain angle of said fabric layer to said other angle thereof comprises the step of stretching said fabric layer in one direction thereof.

3. In a method of making a polymeric coated fabric layer that has a certain total weight of fabric and polymeric material, said method comprising the steps of providing a fabric layer having warps and fills initially woven at a certain angle relative to each other, disposing said fabric layer on a tenter means, then changing said certain angle with said tenter means to another angle whereby said fabric layer is in an altered condition thereof, and securing a polymeric means to said fabric layer to hold said fabric layer in said altered condition thereof, the step of securing said polymeric means comprising the steps of first coating said polymeric means in liquid form onto said fabric layer while said fabric layer is in said altered condition thereof and is on said tenter means and then drying said coating to at least a condition that tends to hold said fabric layer in said altered condition thereof, the improvement wherein the step of providing said fabric layer comprises the step of forming said fabric layer to have a twill weave and to have the yarn thereof of substantially the same size and weight and material as a certain plain woven fabric layer that has substantially the same weight per square yard thereof as the selected fabric layer so that said selected fabric layer is substantially quality equivalent to said certain plain woven layer, wherein the step of changing said certain angle to another angle comprises the step of changing said certain angle of said fabric layer that has said twill weave to an angle that is greater than the angle that can be made by changing said certain angle of said substantially quality equivalent fabric layer that has a plain weave, and wherein the step of coating in combination with the step of changing said certain angle to another angle causes said polymeric coated fabric layer to have said certain total weight with the ratio of the weight of the fabric material to the weight of the polymeric material of said polymeric coated fabric layer means to be approximately 50 or less:50 or greater whereas assuming quality equivalents and without a total weight change the ratio of the weight of the fabric material to the weight of the polymeric material is approximately 60:40 when said quality equivalent fabric layer that has a plain weave has said polymeric material coated thereon in substantially the same manner.

4. A method of making a polymeric coated fabric layer as set forth in claim 3 wherein the step of changing said certain angle of said fabric layer to said other angle thereof comprises the step of stretching said fabric layer in one direction thereof.

5. In a method of making a polymeric coated fabric layer that has a certain total weight of fabric and polymeric material, said method comprising the steps of providing a fabric layer having warps and fills initially woven at a certain angle relative to each other, disposing said fabric layer on a tenter means, then changing said certain angle with said tenter means to another angle whereby said fabric layer is in an altered condition thereof, and securing a polymeric means to said fabric layer to hold said fabric layer in said altered condition thereof, the step of securing said polymeric means comprising the steps of first coating said polymeric means in liquid form onto said fabric layer while said fabric layer is in said altered condition thereof and is on said tenter means and then drying said coating to at least a condition thereof that tends to hold said fabric layer in said altered condition thereof, the improvement wherein the step of providing said fabric layer comprises the step of forming said fabric layer to have a satin weave and to have the yarn thereof of substantially the same size and weight and material as a certain plain woven fabric layer that has substantially the same weight per square yard thereof as the selected fabric layer so that said selected fabric layer is substantially quality equivalent to said certain plain woven layer, wherein the step of changing said certain angle of said fabric layer that has said satin weave to an angle that is greater than the angle that can be made by changing said certain angle of said substantially quality equivalent fabric layer that has a plain weave, and wherein the step of coating in combination with the step of changing said certain angle to another angle causes said polymeric coated fabric layer to have said certain total weight with the ratio of the weight of the fabric material to the weight of the polymeric material of said polymeric coated fabric layer means to be approximately 50 or less:50 or greater whereas assuming quality equivalents and without a weight change the ratio of the weight of the fabric material to the weight of the polymeric material is approximately 60:40 when said quality equivalent fabric layer that has a plain weave has said polymeric material coated thereon in substantially the same manner.

6. A method of making a polymeric coated fabric layer as set forth in claim 5 wherein the step of changing said certain angle of said fabric layer to said other angle thereof comprises the step of stretching said fabric layer in one direction thereof.

* * * * *